(12) United States Patent
Sakamoto et al.

(10) Patent No.: US 8,345,078 B2
(45) Date of Patent: ***Jan. 1, 2013

(54) OPTICAL COMPONENT BOWING DEVICE, OPTICAL DEVICE, OPTICAL SCANNING DEVICE, AND IMAGE FORMING APPARATUS

(75) Inventors: Tetsuya Sakamoto, Saitama (JP);
Katsuyuki Yanagisawa, Saitama (JP);
Katsuhiko Nakaie, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 127 days.

This patent is subject to a terminal disclaimer.

(21) Appl. No.: 12/846,868

(22) Filed: Jul. 30, 2010

(65) Prior Publication Data
US 2010/0296186 A1  Nov. 25, 2010

Related U.S. Application Data

(63) Continuation of application No. 11/783,769, filed on Apr. 12, 2007, now Pat. No. 7,791,623.

(30) Foreign Application Priority Data

Aug. 29, 2006 (JP) ................. 2006-232518

(51) Int. Cl.
*B41J 15/14* (2006.01)
*B41J 27/00* (2006.01)
*G02B 5/08* (2006.01)
(52) U.S. Cl. ........ 347/257; 347/241; 347/242; 347/256; 359/846; 359/849
(58) Field of Classification Search .................. None
See application file for complete search history.

(56) References Cited

U.S. PATENT DOCUMENTS
6,222,565 B1  4/2001  van Os
(Continued)

FOREIGN PATENT DOCUMENTS
JP  5-297197 A  1/1993
(Continued)

OTHER PUBLICATIONS

Office Action issued in Japanese Patent Application No. 2006-232518 on Nov. 15, 2012.

(Continued)

*Primary Examiner* — Matthew Luu
*Assistant Examiner* — Kendrick Liu
(74) *Attorney, Agent, or Firm* — Sheldon J. Moss; Chad M. Herring

(57) ABSTRACT

An optical component bowing device includes a bending moment generating structure. In a particular embodiment, the bending moment generating structure can have extension members that extend in a direction substantially orthogonal to a longitudinal direction of an optical component. The extension members can be positioned adjacent longitudinal end portions of the optical component. The bending moment generating structure can also have loading members that load the extension members in a direction that is parallel to a longitudinal direction of the optical component, whereby displacement of the extension members can generate a bending moment in a supported portion of the optical component that reflects or shapes a light beam. The bending moment generating structure can also include a reflective surface. Extension members on at least one end of the optical component can be T-shaped when seen in plan view in a direction orthogonal to the reflective surface.

2 Claims, 7 Drawing Sheets

U.S. PATENT DOCUMENTS

| | | | |
|---|---|---|---|
| 6,271,869 B1 | 8/2001 | Tada et al. | |
| 2004/0036936 A1 | 2/2004 | Nakajima et al. | |
| 2004/0190096 A1 | 9/2004 | Takase | |
| 2006/0103906 A1* | 5/2006 | Sato et al. | 359/205 |

FOREIGN PATENT DOCUMENTS

| | | | |
|---|---|---|---|
| JP | 5-34612 A | 2/1993 |
| JP | 8-146325 A | 6/1996 |
| JP | 10-268217 A | 10/1998 |
| JP | 11-070693 A | 3/1999 |
| JP | 2001-117040 A | 4/2001 |
| JP | 2004-054146 A | 2/2004 |
| JP | 2004-109333 A | 4/2004 |
| KR | 1020060011181 A | 2/2006 |
| KR | 1020060022417 A | 3/2006 |

OTHER PUBLICATIONS

Ristriction/Election dated Mar. 13, 2012 issued in co-pending U.S. Appl. No. 12/846,866.

Non-Final Office Action dated Apr. 25, 2012 issued in co-pending U.S. Appl. No. 12/846,866.

Non Final Office Action dated Apr. 25, 2012, issued in the U.S. Appl. No. 12/846,866.

* cited by examiner

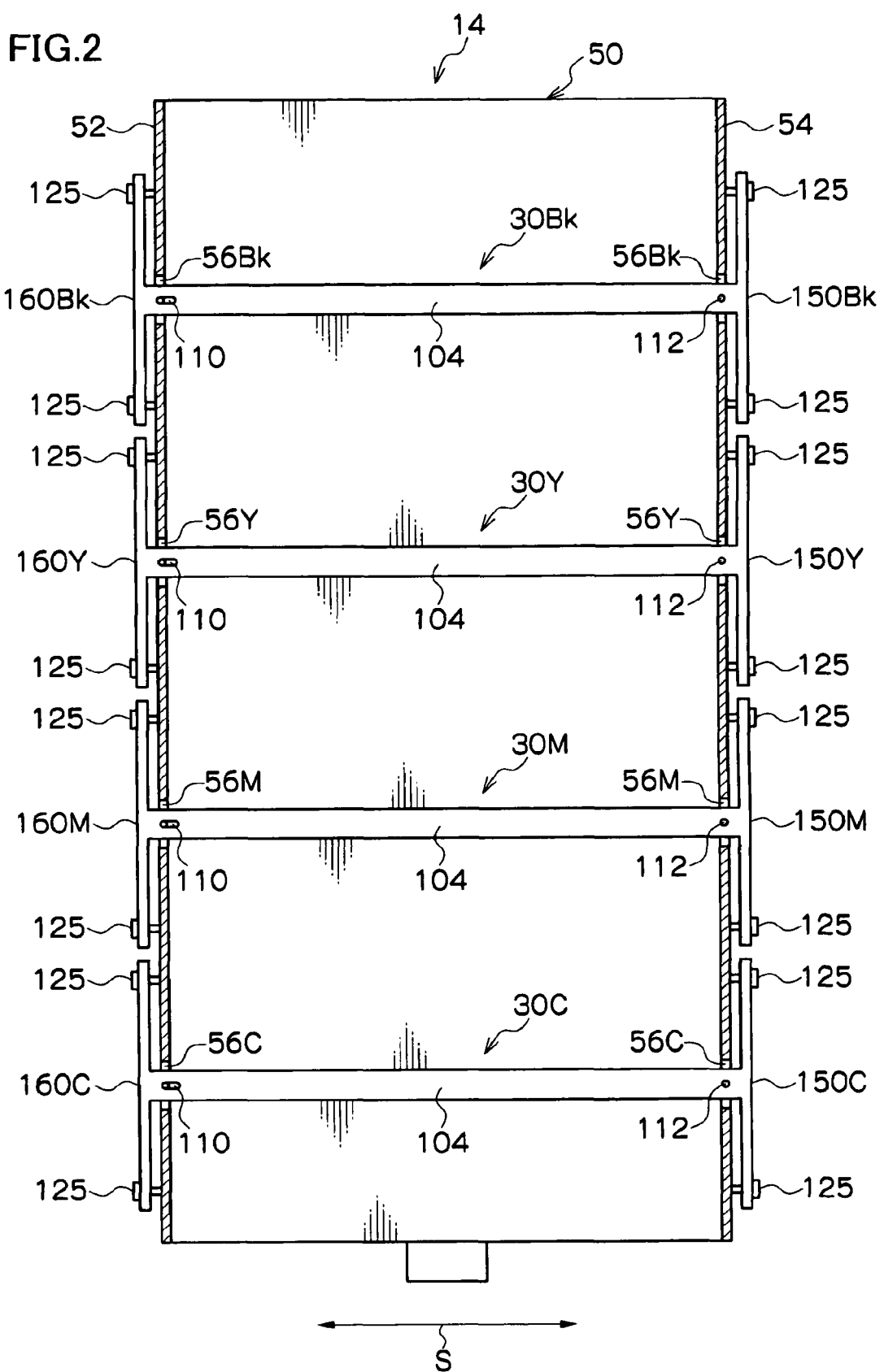

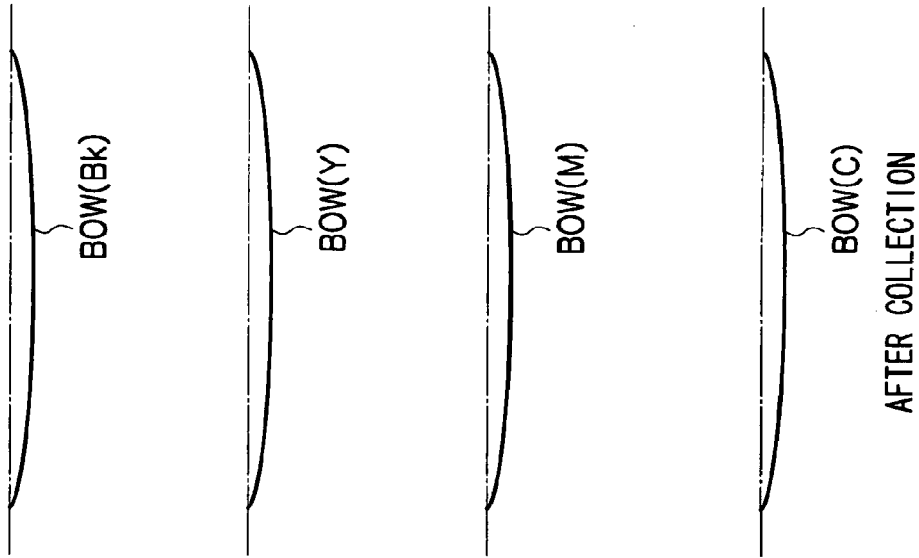
FIG.7B AFTER COLLECTION
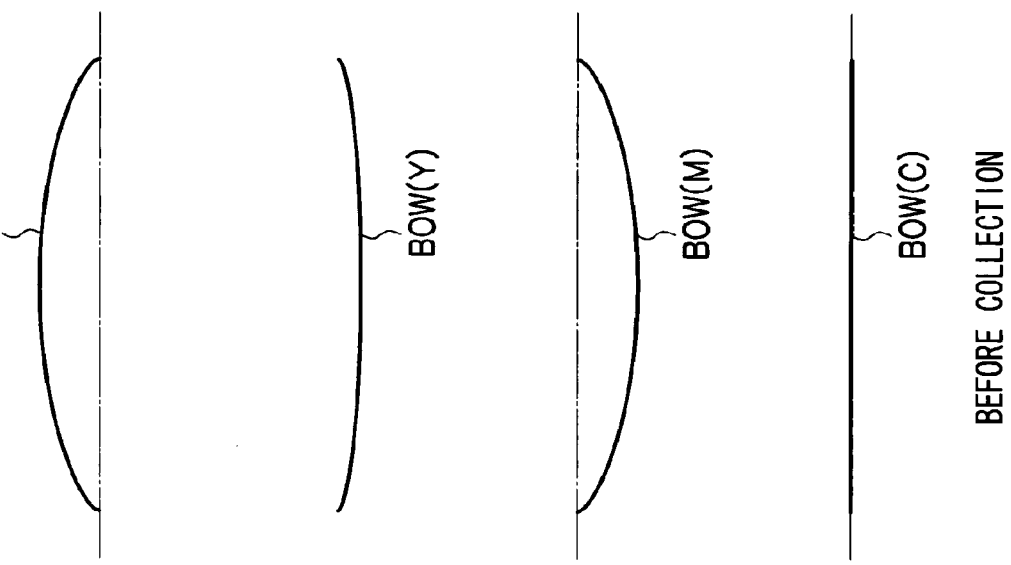
FIG.7A BEFORE COLLECTION

OPTICAL COMPONENT BOWING DEVICE, OPTICAL DEVICE, OPTICAL SCANNING DEVICE, AND IMAGE FORMING APPARATUS

CROSS-REFERENCE TO RELATED APPLICATION

The present application is a continuation of U.S. patent application Ser. No. 11/783,769, filed on Apr. 12, 2007, which is based on and claims priority under 35 USC 119 from Japanese Patent Application No. 2006-232518 filed on Aug. 29, 2006. The contents of both prior applications are hereby incorporated by reference in their entirety.

BACKGROUND

1. Technical Field

The present invention relates to an optical component bowing device, an optical device, an optical scanning device, and an image forming apparatus.

2. Related Art

In an optical scanning device that emits a light beam, a cylindrical lens or the like is caused to bow to correct the scanning position in a direction orthogonal to the scanning direction of the light beam on a photoconductor.

SUMMARY

An optical component bowing device of a first aspect of the invention includes a bending moment generating structure that generates a bending moment in a supported portion of an optical component that reflects or shapes a light beam.

BRIEF DESCRIPTION OF THE DRAWINGS

Exemplary embodiments of the present invention will be described in detail based on the following figures, wherein:

FIG. 2 is a diagram schematically showing, in plan view, relevant portions of the optical scanning device pertaining to the first exemplary embodiment of the invention;

FIG. 7A and FIG. 7B are explanatory diagrams describing bow correction.

DETAILED DESCRIPTION

Figure 1:
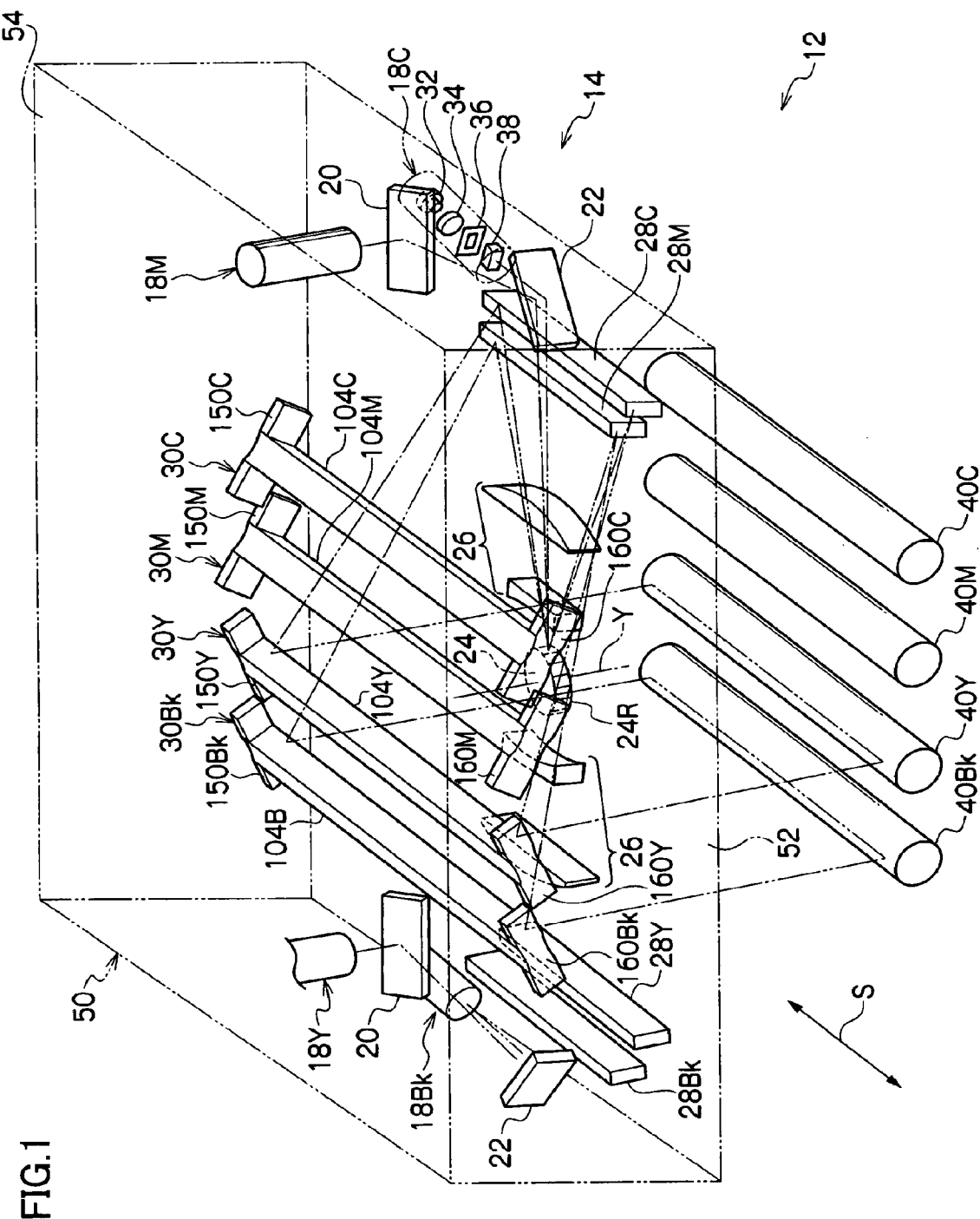
FIG. 1 is a general configural diagram of an image forming apparatus disposed with an optical scanning device pertaining to a first exemplary embodiment of the invention.

In FIG. 1, there is shown the general configuration of an image forming apparatus 12 disposed with an optical scanning device 14 pertaining to a first exemplary embodiment of the present invention. The image forming apparatus 12 is a tandem full-color image forming apparatus where plural photoconductors are juxtaposed, toner images of respective colors are formed on the photoconductors, and then the respective color toner images are superposed to form a full-color toner image.

Below, when members are to be distinguished by color, the letters C (cyan), M (magenta), Y (yellow), and Bk (black) will be added to reference numerals representing those members. When it is not particularly necessary to distinguish between the members by color, the letters C, M, Y, and Bk will be omitted. Further, the direction in which light beams scan optical components will be referred to as a scanning direction.

The optical scanning device 14 includes a box-shaped optical box 50. Housed inside the optical box 50 are various kinds of optical components such as light source members 18C, 18M, 18Y, and 18Bk, plane mirrors 20, plane mirrors 22, a rotating polygon mirror 24, an fθ lens group 26, plane mirrors 28C, 28M, 28Y, and 28Bk, and cylindrical mirrors 30C, 30M, 30Y, and 30Bk having an imaging function in a direction orthogonal to the scanning direction.

A semiconductor laser 32, a collimator lens 34, an aperture 36, and a cylindrical lens 38 having an imaging function in one direction are disposed inside each of the light source members 18C, 18M, 18Y, and 18Bk (in FIG. 1, just the components of the light source member 18C are shown). A light beam is emitted from the semiconductor laser 32 in correspondence to image information of each color and is shaped by the collimator lens 34 having a light beam shaping function. The beam width of the light beam is made into a predetermined width by the aperture 36, and the light beam is focused by the cylindrical lens 38 in a direction corresponding to the direction in which the light beam moves in the circumferential direction with the rotation of a later-described photoconductor 40.

The light beams emitted from the light source members 18M and 18Y are reflected by the plane mirrors 20 and the plane mirrors 22 and made incident on a mirror surface 24R of the rotating polygon mirror 24. Further, the light beams emitted from the light source members 18C and 18Bk are reflected by the plane mirrors 22 and made incident on the mirror surface 24R of the rotating polygon mirror 24.

The rotating polygon mirror 24 is disposed in the center portion of the optical box 50 such that its rotational axis Y coincides with the vertical direction (the direction of gravitational force), and the rotating polygon mirror 24 is rotated about the rotational axis Y by an unillustrated rotary drive device. The light beams made incident on the mirror surface 24R of the rotating polygon mirror 24 are deflected by the movement of the mirror surface 24R resulting from the rotation of the rotating polygon mirror 24.

The light beams deflected by the rotating polygon mirror 24 are transmitted through the fθ lens group 26 having an imaging function, are respectively reflected by the plane mirrors 28C, 28M, 28Y, and 28Bk corresponding to each color, and are further reflected by the cylindrical mirrors 30C, 30M, 30Y, and 30Bk. It will be noted that arrow S represents the scanning direction in which the light beams scan the cylindrical mirrors 30C, 30M, 30Y, and 30Bk.

Surfaces of photoconductors 40C, 40M, 40Y, and 40Bk corresponding to each color and disposed below the optical scanning device 14 are exposed to the light. At this time, due to the rotation of the rotating polygon mirror 24 and the fθ lens group 26, the light beams scan the surfaces of the photoconductors 40C, 40M, 40Y, and 40Bk at substantially uniform velocities in the axial direction.

It will be noted that, when seen in plan view, the cylindrical mirrors 30C, 30M, 30Y, and 30Bk are disposed juxtaposed in a single row parallel to each other (see FIG. 2).

The photoconductors 40C, 40M, 40Y, and 40Bk are shaped like drums, and their longitudinal directions (axial directions of the drums) coincide with the scanning direction. When the image forming apparatus 12 is seen from the side in the scanning direction, the photoconductors 40C, 40M, 40Y, and 40Bk are disposed juxtaposed in a single line with predetermined intervals interposed therebetween.

The surfaces of the photoconductors 40C, 40M, 40Y, and 40Bk are charged by charging devices (not shown). When the photoconductors 40C, 40M, 40Y, and 40Bk rotate, the light beams to which the surfaces of the photoconductors 40C, 40M, 40Y, and 40Bk are exposed (scanned) relatively move in the circumferential direction. Electrostatic latent images are formed on the surfaces of the photoconductors 40C, 40M, 40Y, and 40Bk as a result of the surfaces of the photoconductors 40C, 40M, 40Y, and 40Bk being exposed to the light beams in this manner.

The electrostatic latent images on the photoconductors 40C, 40M, 40Y, and 40Bk are made visible by developing devices (not shown) corresponding to each color, whereby toner images of the respective colors are formed on the photoconductors 40C, 40M, 40Y, and 40Bk.

The color toner images formed on the respective photoconductors 40C, 40M, 40Y, and 40Bk are sequentially transferred to an intermediate transfer body such as an endless intermediate transfer belt (not shown), and the four colors are superposed to form a full-color image on the intermediate transfer belt. Then, the full-color image formed on the intermediate transfer belt is transferred all at once to a recording medium and fixed by a fixing device (not shown) to the recording medium, so that a desired full-color image can be obtained on the recording medium.

Next, the cylindrical mirrors 30C, 30M, 30Y, and 30Bk will be described. Because the cylindrical mirrors 30C, 30M, 30Y, and 30Bk corresponding to the respective colors all have the same configuration, they will be described without distinguishing between them by color.

Figure 3A:
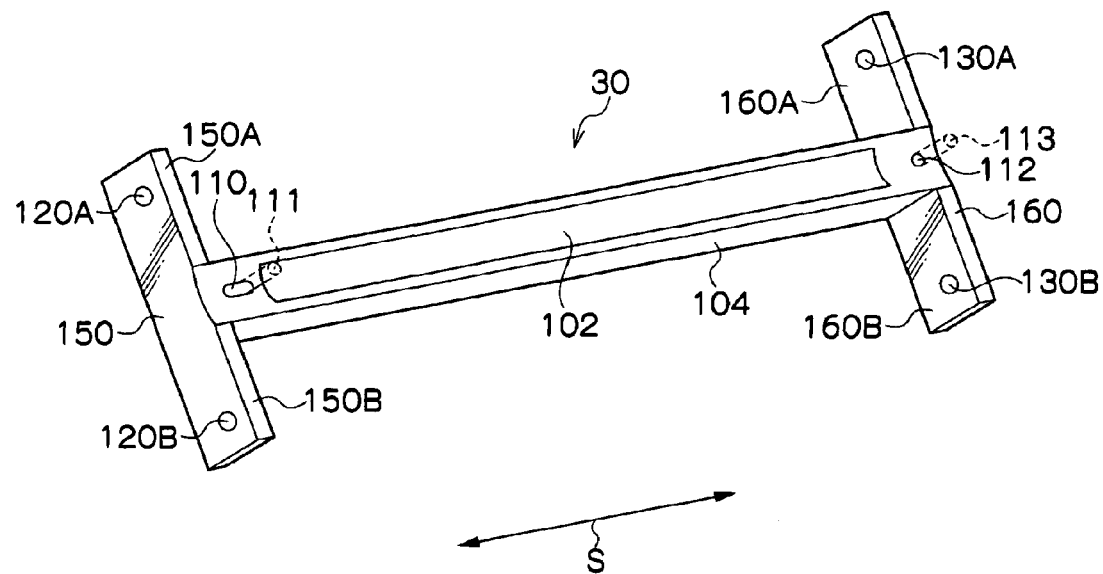
FIG. 3A is a perspective diagram showing a cylindrical mirror.

As shown in FIG. 3A, a reflective surface 102 of each of the cylindrical mirrors 30 has power just in a direction orthogonal to the scanning direction (arrow S) (i.e., a direction corresponding to the direction in which the light beam moves in the circumferential direction with the rotation of the photoconductor 40), and the reflective surface 102 corrects variations in the scan line resulting from optical face tangle error in the mirror surface 24R (see FIG. 1) of the rotating polygon mirror 24 (optical face tangle error correction). The cylindrical mirror 30 includes a quadrangular prism-shaped mirror body 104 disposed with the reflective surface 102 on one side. It will be noted that the longitudinal direction of the mirror body 104 coincides with the scanning direction represented by arrow S. Further, in FIG. 3A and FIG. 3B, the orientation of the reflective surface 102 is shown oppositely from the orientation shown in FIG. 1 and FIG. 2 (i.e., in FIG. 1 and FIG. 2, the reflective mirror 102 faces down).

Extension members 150A and 150B that extend toward mutually opposite sides in a direction substantially orthogonal to the longitudinal direction (scanning direction) when seen in plan view in a direction orthogonal to the reflective surface 102 are disposed on an end portion on one longitudinal direction side (scanning start side) of the mirror body 104 (when it is not necessary to distinguish between the two, they will be referred to simply as the extension members 150). Similarly, extension members 160A and 160B are also disposed on the end portion on the other side (scanning end side) (similarly, when it is not necessary to distinguish between the two, they will be referred to simply as the extension members 160). Thus, each of the end portions on the one side and on the other side of the cylindrical mirror 30 is shaped like a T when seen in plan view in the direction orthogonal to the reflective surface 102. It will be noted that the extension members 150 and 160 are disposed further outside in the scanning direction than the reflective surface 102.

Further, by "substantially orthogonal" is meant an angular range of an angle of 90°±3°. It will be noted that it is alright even if the extension members 150 and 160 are not substantially orthogonal to the longitudinal direction. It suffices as long as the extension members extend in a direction intersecting the longitudinal direction (scanning direction). It is also alright even if the extension member 150A and the extension member 150B (and the extension member 160A and the extension member 160B) are not formed on the same straight line. For example, the extension member 150A and the extension member 150B (and the extension member 160A and the extension member 160B) may also form an angle (like an L shape). Further, the extension members may also be curved rather than being straight. Moreover, it is alright even if just one of the extension member 150A and the extension member 150B (and the extension member 160A and the extension member 160B) is disposed.

In the present exemplary embodiment, after the mirror body 104 and the extension members 150 and 160 have been formed as separate components, the mirror body 104 and the extension members 150 and 160 are joined together by adhesion or some other method so that the mirror body 104 and the extension members 150 and 160 are integrally configured. It will be noted that the mirror body 104 and the extension members 150 and 160 may also be formed as an integral mold.

Support holes 110 and 112 are formed in the longitudinal direction center sides of the end portions of the one side and the other side of the mirror body 104. Either one of the support holes 110 and 112 is an elongate hole whose longitudinal direction coincides with the longitudinal direction (scanning direction) of the cylindrical mirror 30. In the present exemplary embodiment, the support hole 110 on the one side is an elongate hole. Support pins 111 and 113 fixed to the optical box 50 (see FIG. 1) respectively pass through these two support holes 110 and 112 so that the cylindrical mirror 30 is supported in the optical box 50.

Further, through holes 120A, 120B, 130A, and 130B that penetrate the extension members 150A, 150B, 160A, and 160B are formed in longitudinal direction center sides from the end portions (in the vicinities of the end portions) of the extension members 150A, 150B, 160A, and 160B.

Figure 3B:
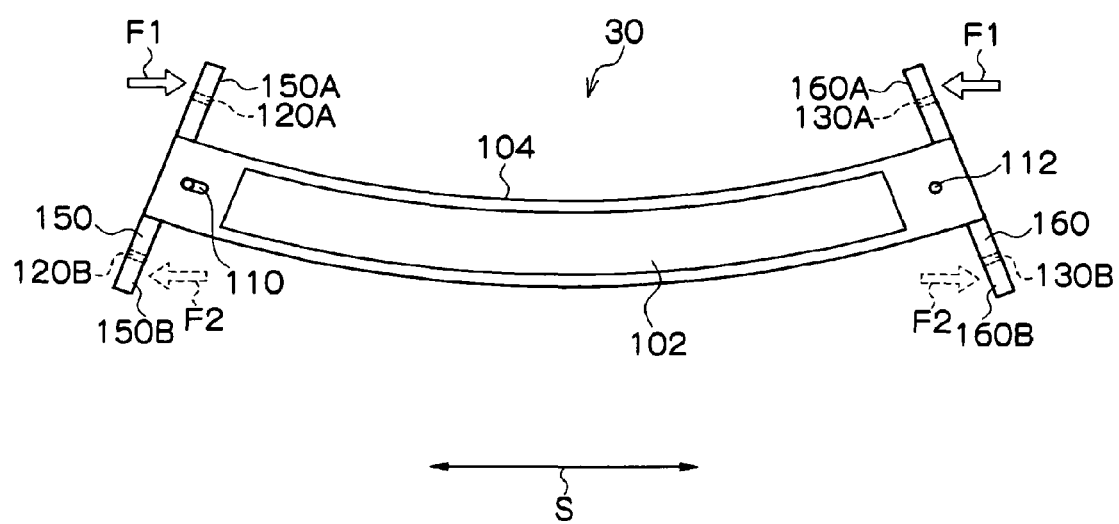
FIG. 3B is a plan diagram showing a state where the cylindrical mirror is bowed.

Additionally, as represented by arrow F1 in FIG. 3B, when a load is applied from the outsides to the insides of the extension members 150A and 160A to cause the extension members 150 and 160 to be displaced in the scanning direction, a bending moment is generated in the portions of the support holes 110 and 112. The cylindrical mirror 30 is caused by this bending moment to bow (in order to make it easier to understand, in FIG. 3B the cylindrical mirror 30 is shown as being bowed more greatly than in actuality). It will be noted that, as represented by arrow F2, a load may also be applied from the insides to the outsides of the extension members 150B and 160B to cause the extension members 150 and 160 to be displaced.

Further, when a load that is opposite from the directions of arrows F1 and F2 is applied, the cylindrical mirror 30 bows oppositely from that shown in FIG. 3B (i.e., with respect to FIG. 3B, the cylindrical mirror 30 would bow such that its convex side faces up).

As shown in FIG. 2, both longitudinal direction end portions of each of the cylindrical mirrors 30Bk, 30Y, 30M, and 30C project from windows 56Bk, 56Y, 56M, and 56C formed in side surface portions 52 and 54 of the optical box 50. In other words, the extension members 150Bk, 150Y, 150M, and 150C are exposed to the outside of the optical box 50. It will be noted that the gaps between the windows 56Bk, 56Y, 56M, and 56C and the cylindrical mirrors 30Bk, 30Y, 30M, and 30C are sealed with a sealing member (not shown) such that external dust or the like does not enter into the optical box 50.

As shown in FIG. 3A and FIG. 3B, the through holes 120A, 120B, 130A, and 130B are formed in the longitudinal direction (scanning direction) in both end portions of the extension members 150 and 160 of each of the cylindrical mirrors 30. Screws 125 are passed through the through holes 120A, 120B, 130A, and 130B and screwed into screw holes (not shown) in the side surface portions 52 and 54 of the optical box 50.

By adjusting how much the screws 125 are screwed into the screw holes in the side surface portions 52 and 54, the extension members 150 and 160 are displaced in the scanning direction and the cylindrical mirror 30 bows (see FIG. 3B). It will be noted that the bowing direction (i.e., the direction that the convex side of the cylindrical mirror 30 faces) may be either up or down in FIG. 2.

As mentioned above, the image forming apparatus 12 of the present exemplary embodiment superposes respective color toner images to form a full-color image. Thus, when the respective color toner images are not precisely superposed, color misregistration occurs.

One cause of color misregistration is, as shown in FIG. 7A, when scan lines (BOW(Bk) to BOW(C)) of the light beams scanning the photoconductors 40Bk, 40Y, 40M, and 40C become bowed in the direction orthogonal to the scanning direction (i.e., the direction in which the light beams move in the circumferential direction with the rotation of the photoconductors 40) with respectively different curvatures. For this reason, as shown in FIG. 7B, bow correction for correcting and matching up the bowing of the scan lines (BOW(Bk) to BOW(C)) is performed to correct color misregistration.

Additionally, in the image forming apparatus 12 of the present exemplary embodiment, bow correction is performed (see FIG. 3B) by adjusting how much the screws 125 are screwed into the screw holes in the side surface portions 52 and 54 of the optical box 50 and adjusting the scanning direction displacement amounts of the extension members 150Bk, 150Y, 150M, and 150C of the cylindrical mirrors 30Bk, 30Y, 30M, and 30C—that is, the bending moment generated in the support holes 110 and 112 in each of the cylindrical mirrors 30Bk, 30Y, 30M, and 30C—to adjust the bowing amounts of the cylindrical mirrors 30Bk, 30Y, 30M, and 30C.

In the present exemplary embodiment, as shown in FIG. 2, the extension members 150 and 160 of each of the cylindrical mirrors 30 are exposed from the side surface portions 52 and 54 of the optical box 50, but the invention is not limited to this. The extension portions 150 and 160 of the cylindrical mirrors 30 may also be disposed inside the optical box 50.

Further, the screws 125 are screwed into screw holes in the side surface portions 52 and 54 to cause the extension members 150 and 160 of the cylindrical mirrors 30 to be displaced, but the invention is not limited to this. Screw holes may also be formed in sites other than the optical box 50 and screws may be screwed into those screw holes to cause the extension members 150 and 160 to be displaced.

Next, an optical scanning device 214 of a second exemplary embodiment pertaining to the present invention will be described. It will be noted that description that is redundant with the description of the first exemplary embodiment will be omitted.

Figure 4:
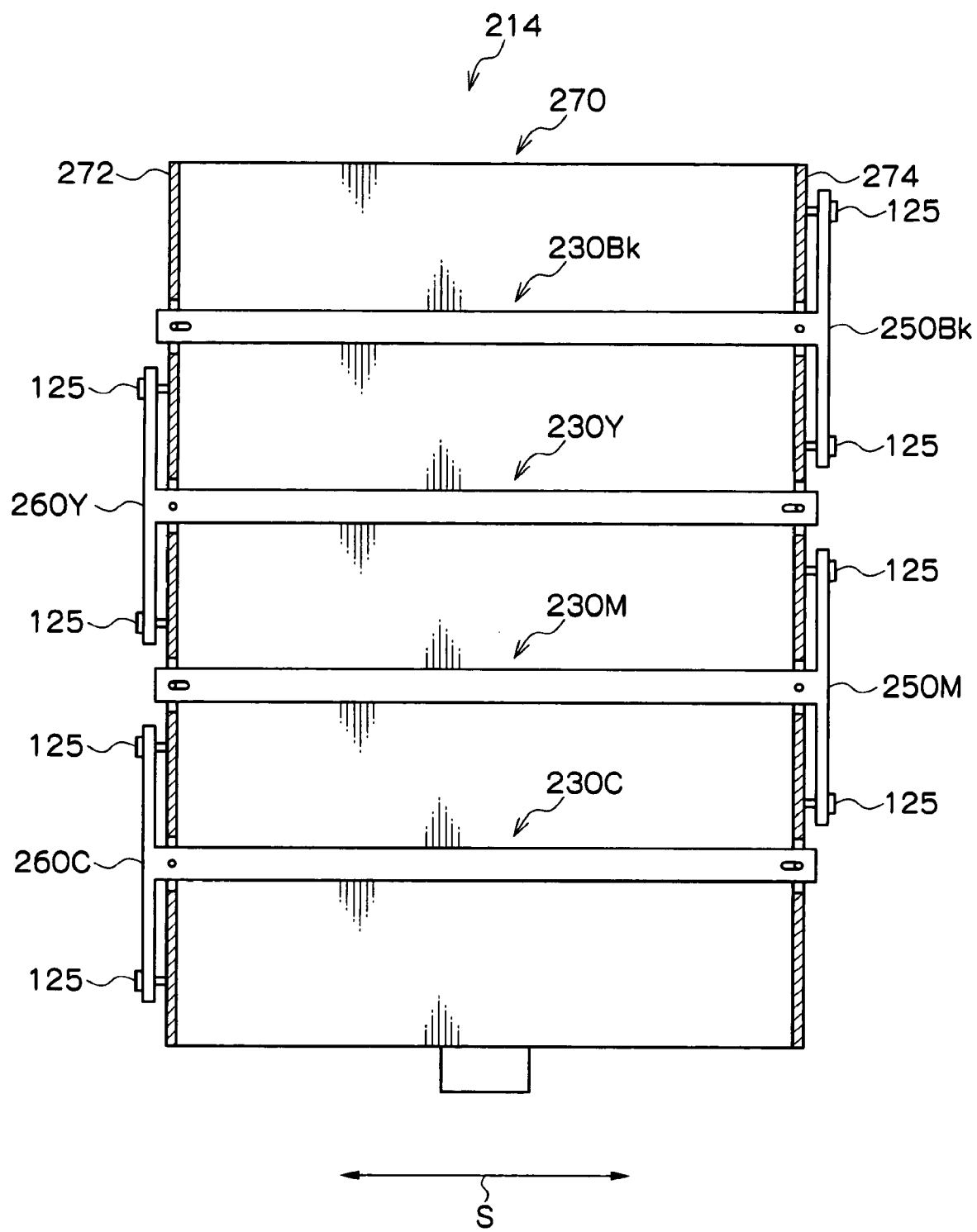
FIG. 4 is a diagram schematically showing, in plan view, relevant portions of an optical scanning device pertaining to a second exemplary embodiment of the invention.

As shown in FIG. 4, extension members 250 and 260 are alternately disposed on either one of the one side (scanning start side) and the other side (scanning end side) of adjacent cylindrical mirrors 230. Specifically, an extension member 250Bk is disposed on the end portion on the one side of a cylindrical mirror 230Bk, an extension member 260Y is disposed on the end portion on the other side of a cylindrical mirror 230Y, an extension member 250M is disposed on the end portion on the one side of a cylindrical mirror 230M, and an extension member 260C is disposed on the end portion on the other side of a cylindrical mirror 230C.

Additionally, the extension members 250 and the extension members 260 of the cylindrical mirrors 230 that are adjacent when seen in the scanning direction (arrow S) are disposed so as to overlap each other.

Further, the extension members 250 and 260 of the cylindrical mirrors 230 are exposed from side surface portions 272 and 274 of an optical box 270. Screws 125 are screwed into screw holes in the side surface portions 272 and 274 to cause the extension members 250 and 260 of the cylindrical mirrors 230 to be displaced in the scanning direction.

It will be noted that in the present exemplary embodiment also, similar to the first exemplary embodiment, the extension members 250 and 260 of the cylindrical mirrors 230 may also be disposed inside the optical box 270. Further, screw holes may be disposed in sites other than the optical box 270 and the screws 125 may be screwed into these screw holes to cause the extension members 250 and 260 to be displaced.

Next, an optical scanning device 314 of a third exemplary embodiment pertaining to the present invention will be described. It will be noted that description that is redundant with the description of the first exemplary embodiment will be omitted.

Figure 5:
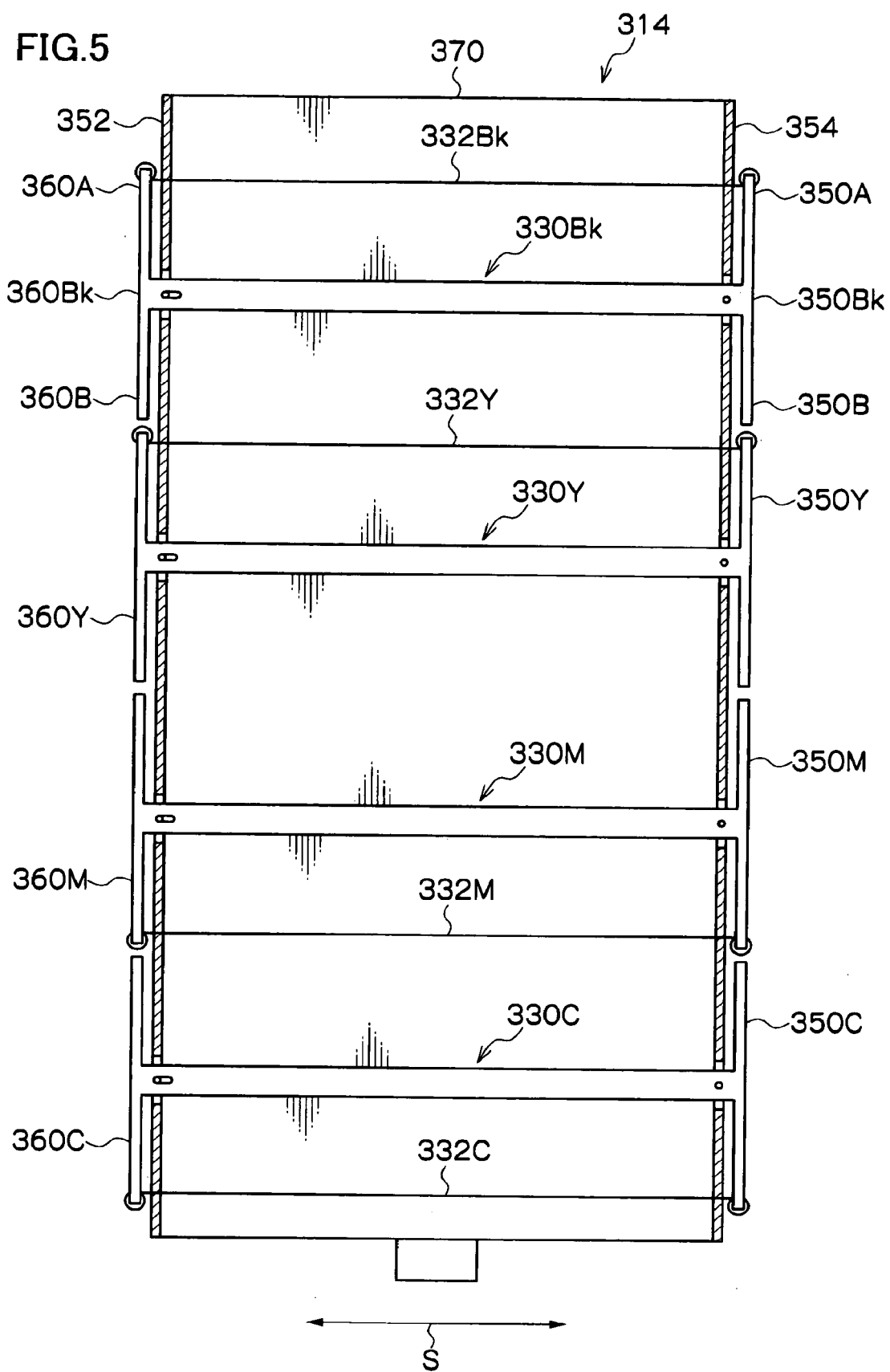
FIG. 5 is a diagram schematically showing, in plan view, relevant portions of an optical scanning device pertaining to a third exemplary embodiment of the invention.

As shown in FIG. 5, extension members 350 and 360 of cylindrical mirrors 330 are exposed from side surface portions 352 and 354 of an optical box 370.

The extension members 350 on the one side (scanning start side) of the cylindrical mirrors 330 and the extension members 360 on the other side (scanning end side) of the cylindrical mirrors 330 are coupled together by linear members 332 such as wires or piano wires. Additionally, the lengths of the linear members 332 are adjusted (shortened)—that is, the distances between the extension members 350 on the one side of the cylindrical mirrors 330 and the extension members 360 on the other side of the cylindrical mirrors 330 are adjusted (shortened)—to cause the extension members 350 and 360 to be displaced and to cause the cylindrical mirrors 330 to bow.

Further, the linear expansion coefficients of the linear members 332Bk, 332Y, 332M, and 332C are caused to vary, for example, in response to differences in temperature change and differences in length. For example, the linear expansion coefficients of the linear members 332Bk, 332Y, 332M, and 332C are selected in accordance with differences in temperature rises in places where the cylindrical mirrors 330Bk, 330Y, 330M, and 330C are disposed. In other words, the linear expansion coefficients are made smaller in places where the temperature rise is greater. For example, the linear expansion coefficients of the linear members 332 are selected in accordance with the distance from a heat source such as the fixing device that fixes the full-color toner image to the recording medium. For example, assuming that the cylindrical mirror 330Bk is the closest to the heat source and that the cylindrical mirror 330C is the farthest from the heat source, then the linear expansion coefficient of the linear member 332Bk is made the smallest, and the linear expansion coefficients are made greater from there on in the order of the linear member 332Y, the linear member 332M, and the linear member 332C.

Examples of materials for the linear members 332 whose linear expansion coefficients are different include the following.

stainless steel wires (according to Japan Industrial Standards (JIS))
SUS304: $1.73(\times 10^{-5})$
SUS316: $1.60(\times 10^{-5})$
SUS430: $1.04(\times 10^{-5})$
phosphor bronze wires: $1.80(\times 10^{-5})$
hard steel wires: $1.20\ (\times 10^{-5})$ It will be noted that because the linear members 332 such as wires or piano wires can only cause the extension members 350 and 360 to be displaced in the direction in which the distances between the extension members 350 and the extension members 360 are narrowed, the extension member 350A and the extension member 360A, or the extension member 350B and the extension member 360B, are coupled together on the opposite side of the direction in which one wishes the cylindrical mirrors 330 to bow in convex shapes. In FIG. 5, the cylindrical mirror 330Bk and the cylindrical mirror 330Y bow in convex shapes downward in FIG. 5, and the cylindrical mirror 330M and the cylindrical mirror 330C bow in convex shapes upward in FIG. 5.

In the present exemplary embodiment, the extension members 350 on the one side of the cylindrical mirrors 330 and the extension members 360 on the other side of the cylindrical mirrors 330 are coupled together by the linear members 332 such as wires or piano wires, but the invention is not limited to this. It suffices as long as coupling members couple together the extension members 350 on the one side and the extension members 360 on the other side and have lengths that are adjustable. For example, rod-shaped coupling members may also be used. In the case of rod-shaped coupling members, the distances between the extension members 350 and the extension members 360 may be increased to cause the extension members 350 and 360 to be displaced.

Further, in the present exemplary embodiment also, similar to the first exemplary embodiment and the second exemplary embodiment, the extension members 350 and 360 of the cylindrical mirrors 330 may also be disposed inside the optical box 370.

Next, an optical scanning device 414 of a fourth exemplary embodiment of the present invention will be described.

Figure 6:
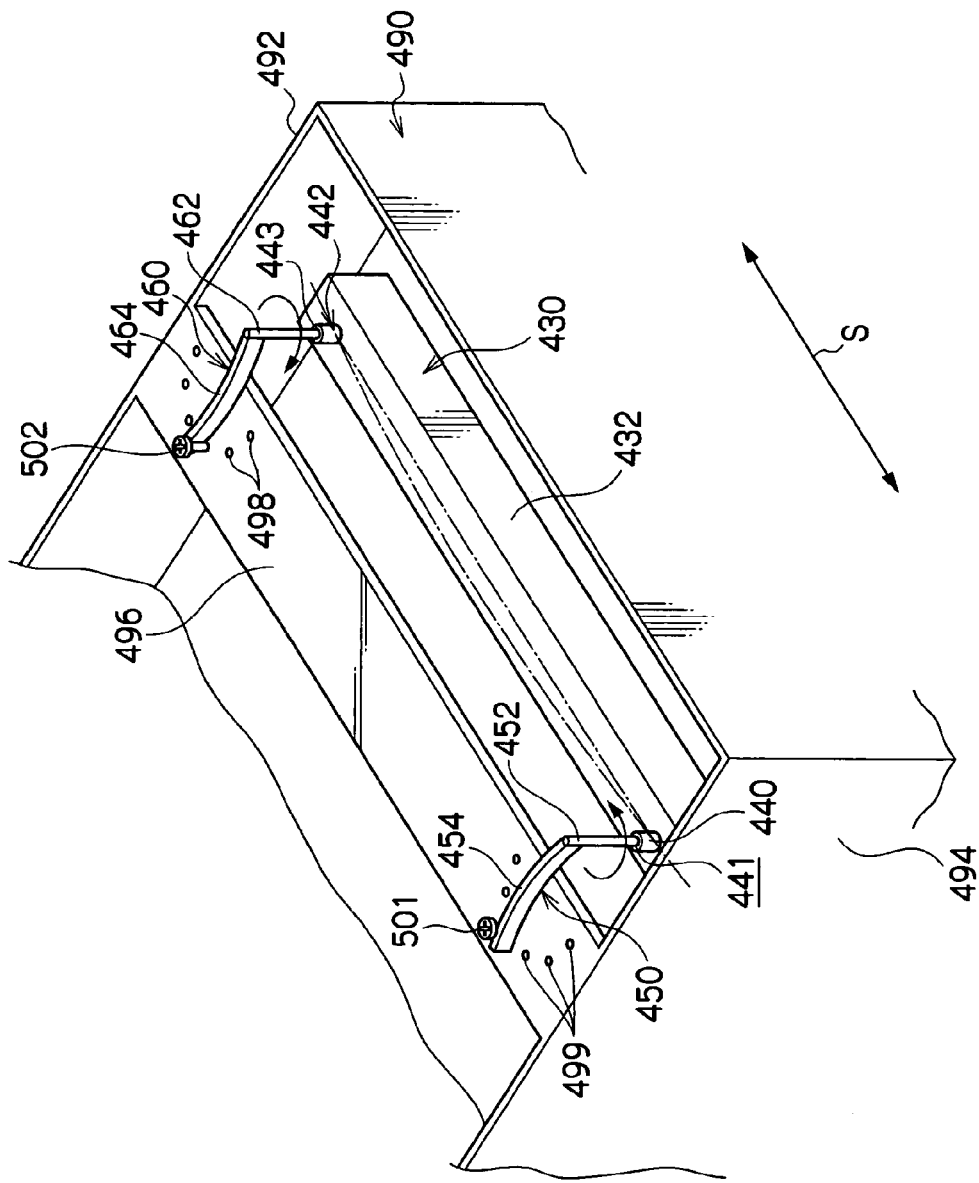
FIG. 6 is a perspective diagram schematically showing relevant portions of an optical scanning device pertaining to a fourth exemplary embodiment of the invention.

As shown in FIG. 6, a resin cylindrical lens 430 for performing optical face tangle error correction is disposed in the optical scanning device 414. In FIG. 6, just one cylindrical lens 430 is shown, but in actuality, similar to the first exemplary embodiment, four are disposed in correspondence to the respective colors.

As shown in FIG. 6, a lens body 432 of the cylindrical lens 430 has a quadrangular prism shape whose longitudinal direction coincides with the scanning direction. Convex portions 440 and 442, in which support holes 441 and 443 are formed in a direction orthogonal to the scanning direction (i.e., a direction corresponding to the direction in which the light beam moves in the circumferential direction in accompaniment with the rotation of the photoconductor 40), are integrally formed on the end portions on the one side (scanning start side) and the other side (scanning end side) of the lens body 432. Shaft portions 452 and 462 of torsion bar springs 450 and 460 are inserted into the support holes 441 and 443 in the convex portions 440 and 442. The shaft portions 452 and 462 are configured so as to not rotate inside the support holes 441 and 443.

The torsion bar springs 450 and 460 include, from the top portions of the shaft portions 452 and 462, plate-shaped adjustment portions 454 and 464 whose longitudinal direction coincides with the direction orthogonal to the shaft portions 452 and 462. When the adjustment portions 454 and 464 are rotated about the shaft portions 452 and 462, the shaft portions 452 and 462 twist, and a bending moment is generated in the convex portions 440 and 442 because of the reaction force. Additionally, due to this bending moment, the cylindrical lens 430 bows.

Pins 501 and 502 are inserted into plural adjustment holes 498 and 499 formed in a fixed portion 496 disposed spanning the distance between a side surface portion 492 and a side surface portion 494 of an optical box 490, and the adjustment portions 454 and 464 of the torsion bar springs 450 and 460 are caught on the pins 501 and 502. The adjustment holes 498 and 499 are plurally formed in a circle around the support holes 441 and 443 (the shaft portions 452 and 462 of the torsion bar springs 450 and 460) in the cylindrical lens 430. Additionally, by changing the adjustment holes 498 and 499 into which the pins 501 and 502 are to be inserted, the rotation amount of the adjustment portions 454 and 464 of the torsion bar springs 450 and 460—that is, the bending moment generated in the convex portions 440 and 442 of the cylindrical lens 430—can be adjusted to adjust the bowing amount of the cylindrical lens 430.

The present invention is not limited to the preceding exemplary embodiments and can be implemented in various aspects in a range that does not depart from the gist of the invention.

For example, in the preceding exemplary embodiments, four light beams to which the four photoconductors 40Bk, 40Y, 40M, and 40C are exposed were emitted from one optical scanning device 14, 214, 314, or 414, but the invention is not limited to this. For example, the image forming apparatus may also be disposed with one optical scanning device for each of the photoconductors (for a total of four optical scanning devices).

Further, in the preceding exemplary embodiments, the image forming apparatus was disposed with the four photoconductors 40Bk, 40Y, 40M, and 40C, but the invention is not limited to this. The image forming apparatus may also be disposed with three or less or five or more photoconductors.

Further, in the preceding exemplary embodiments, as examples of optical components to which the invention may be applied, the invention was applied to the cylindrical mirrors 30, 230, and 330 and to the cylindrical lens 430, but the invention is not limited to this. The invention can also be applied to optical components that reflect or shape light beams, such as other lenses and mirrors of an optical scanning device.

Moreover, in the preceding exemplary embodiments, the invention was applied to optical components of an optical scanning device of an image forming apparatus, but the invention is not limited to this. The invention can also be applied to optical components that reflect or shape light beams, such as lens and mirrors used in other optical devices. For example, the invention can be applied to optical components used in barcode reading apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical component bowing device, comprising:
    a bending moment generating structure including:
        extension members that extend in a direction substantially orthogonal to a longitudinal direction of an optical component, the extension members being positioned adjacent longitudinal end portions of the optical component;
        loading members that load the extension members in a direction that is parallel to a longitudinal direction of the optical component, whereby displacement of the extension members generates a bending moment in a supported portion of the optical component that reflects or shapes a light beam; and
    a reflective surface, wherein extension members on at least one end of the optical component are T-shaped when seen in plan view in a direction orthogonal to the reflective surface.

2. The optical component bowing device according to claim 1, wherein the loading members comprise adjustment screws for applying a load to the extension members to cause the displacement of the extension members.

* * * * *